United States Patent [19]
Cavanagh

[11] Patent Number: 5,918,503
[45] Date of Patent: Jul. 6, 1999

[54] SPLIT HOUSING TRANSMISSION

[76] Inventor: Paul D. Cavanagh, 254 Middle Rd., Byfield, Mass. 01922

[21] Appl. No.: 08/801,933

[22] Filed: Feb. 15, 1997

[51] Int. Cl.⁶ .............................. F16H 37/00; B63H 19/00
[52] U.S. Cl. ...................................... 74/15.69; 416/170 R
[58] Field of Search .............................. 74/15.69, 484 R; 416/170 R

[56] References Cited

U.S. PATENT DOCUMENTS

| | | | |
|---|---|---|---|
| 4,368,454 | 1/1983 | Pilatzki | 74/484 R |
| 4,574,653 | 3/1986 | Hiramitsu et al. | 74/484 R |
| 4,768,394 | 9/1988 | Mizuno et al. | 74/484 R |

*Primary Examiner*—Allan D. Herrman
*Attorney, Agent, or Firm*—Don Halgren

[57] ABSTRACT

The present invention comprises a transmission for the distribution of power from a rotating shaft, which shaft is supported between a pair of housing segments, which housing segments are connectedly joined to one another, including a rotatable shaft having a power source at one end thereof, for rotation of the shaft; a first housing enclosing at least a portion of the rotatable shaft, the housing having a first end with a plurality of spaced apart longitudinally directed holes therein; a flange having at least one radially directed projection thereon, the projection having a cammed surface which sweeps across the holes on the first end of the first housing; a second housing having a first end with a plurality of circumferentially spaced apart longitudinally directed holes therein; a plurality of reciprocally moveable pins disposed within the holes in the first and the second housing; and a cam arranged within the second housing, so as to effectuate longitudinal movement of the pins within the second housing to return their engagement with the holes in the first housing, thus locking the housing portions into non-rotative engagement with one another as the radially projecting cam sweeps past each pin.

12 Claims, 1 Drawing Sheet

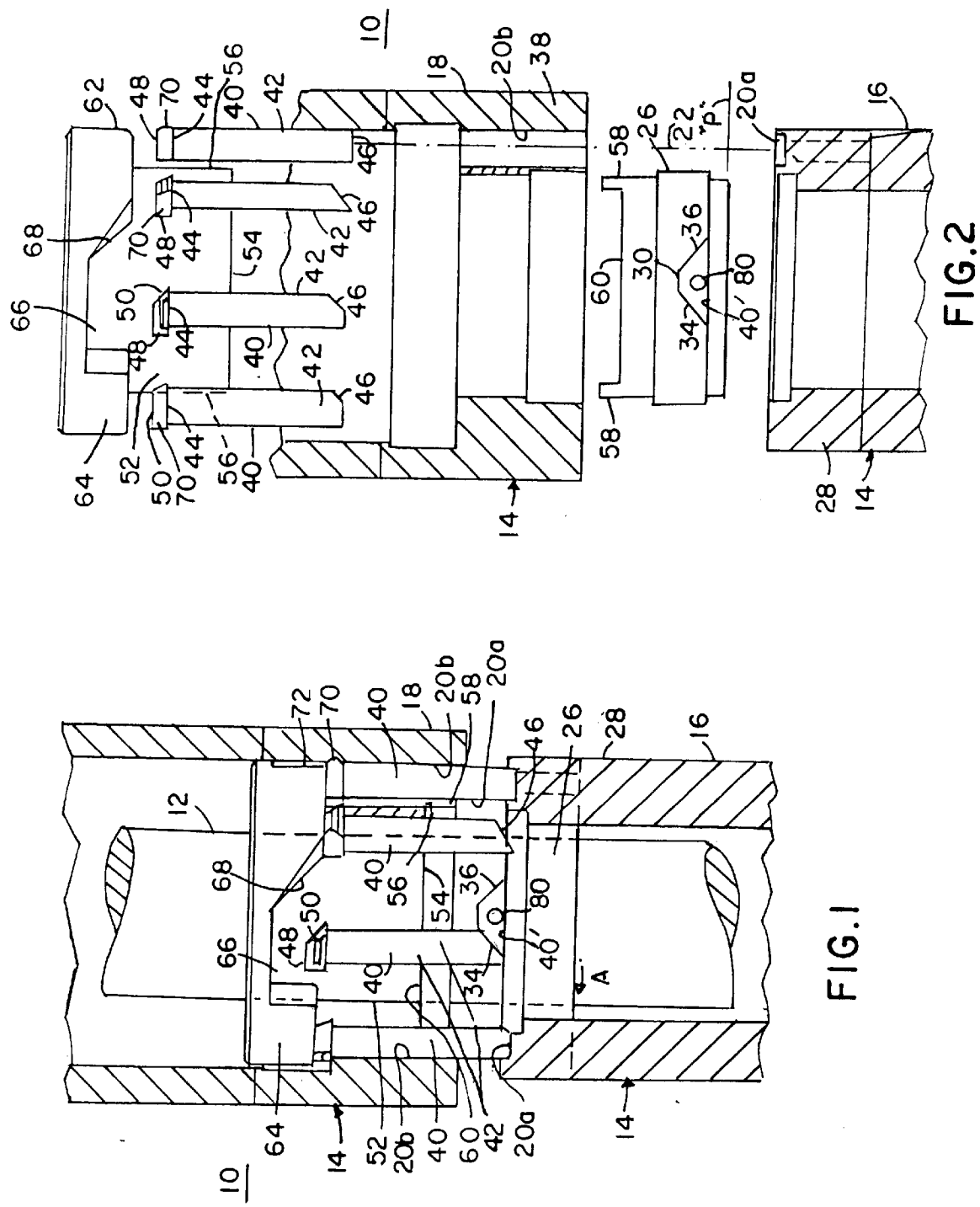

SPLIT HOUSING TRANSMISSION

BACKGROUND OF THE INVENTION

1. Field of the Invention

This invention relates to transmissions, and more particularly to drive shafts rotatable within a split stationary housing with output through that housing.

2. Prior Art

Transmissions and drive shafts have been around for many centuries. Typically however, they take power from a drive shaft in a direction perpendicular to the axis of rotation of that shaft, typically a gearing of some sort must be arranged on one end of that shaft.

Other modes of power takeoff from that drive shaft could include some form of spur gear or pulley or a propeller. However, such propeller or circumferential sweeping "take off" such as a propeller would not permit the rotating drive shaft to be maintained within a stationery housing, which housing is structurally connected to the stationary housing on the opposite side of the propeller or the like.

Such a power takeoff within a split or divided housing would be applicable towards boat propulsion, for the utilization of a plurality of propellers, for any use where there is have a rotating shaft inside a fixed shaft and there is a need for taking power out of the rotating shaft at one or more spaced apart locations anywhere along its longitudinal axis.

It is therefore an object of the present invention, to provide a drive mechanism which overcomes the disadvantages of the prior art.

It is a further object of the present invention to provide a power transmission takeoff from a rotating shaft, which rotating shaft is disposed within a fixed split housing, which fixed split housing portions are connectively and non-rotationally attached to one another at the location of the power takeoff.

BRIEF SUMMARY OF THE INVENTION

The present invention comprises an elongated, rotatable transmission shaft, which shaft is rotatably disposed within an elongated divided housing. The divided housing is comprised of at least two stationary housing sections coaxially surrounding the shaft, between which sections, power may be taken from or provided to the shaft, such as a propeller or the like, while maintaining the housing portions on each side of that propeller or the like, in a non-rotative, longitudinal engagement with one another while the propeller or the like rotates sweepilngly between them.

Each housing portion has an annular array of longitudinally directed holes spaced circumferentially therearound, the holes in the repective housings being in longitudinal alignment with one another.

The rotatable shaft disposed within the stationary housing portions has an annular flange rigidly attached thereon. The annular flange is longitudinally adjacent a first end of the first housing portion. The annular flange has a pair of diametrically opposed ears which extend radially outwardly therefrom. Each ear has a pair of sloped cam surfaces acutely angled with respect to the plane of rotation of the ears. The ears also have a base surface which is in close rotative proximity to the longitudinally directed openings within the first end of the first housing portion. Each ear could comprise one or more propeller blades or like power take off devices.

A second housing portion extends radially outwardly of the rotatable shaft, and is slightly spaced apart from yet is longitudinally adjacent to the first housing. The spaced apart gap between the stationary housings makes room for the "ears" or like propeller/power take off means. The second housing portion also has a corresponding plurality of circumferentially spaced apart longitudinally directed holes at its end adjacent the first housing portion.

A pin is reciprocally disposed between each of these corresponding longitudinally aligned holes in the first and second housing portions. Each of the pins has a first end and a second end. The first end of each pin has a cam (hemispherical or the like) surface or a sloped surface thereon arranged at an acute angle with respect to the longitudinal access of the pin, which acute angle is slightly greater than the acute angle of the cam surfaces with respect to their plane of rotation about the longitudinal axis of the shaft.

Each pin has a second end, and may have a shouldered end cap thereon. The end cap has a sloped planar can surface thereon, which sloped surface faces in the direction of rotation opposite the direction of rotation of the shaft. The sloped surface on the first end of each pin lies in a plane which is disposed at an acute angle with respect to the plane in which the sloped surface on the second end of the pin lies.

A rotatable sleeve mounts radially within the first end of the second housing. The rotatable sleeve has a first end with a pair of diametrically spaced apart slots thereon. Each of the slots mates with a correspondingly located tab on the respective annular edge of the ring flange which carries the radially directed ears (propeller/power take off) attached to the rotatable shaft. Interdigitation between the slots on the sleeve and the tabs on the annular flange causes the sleeve to rotate when the shaft rotates.

The sleeve has a second end with a radially outwardly directed shoulder thereon. The shoulder includes a pair of diametrically opposite cam openings. Each of the cam openings has a cam surface which is arranged to slidably engage the sloped planar cam surface on the end cap on the second end of each of the longitudinally directed pins supported in the first end of the second housing portion. Each end cap may have a radially outwardly directed engagement side edge, of arcuate configuration. The engagement side of each cap is in sliding contact with the inner surface of the second housing portion, thereby preventing each pin from rotating about its longitudinal axis. The pins, in a further embodiment, may be permitted to rotate in their holes if they have hemispherically shaped ends to act as cam surfaces.

In operation of the present invention, rotative power may be supplied to either end or both ends of the rotatable shaft. The first housing and the second housing are arranged in a stationary, supportive relationship about the rotatable shaft, interlocked to one another by virtue of the majority of the pins at any one time, extending between the majority of the longitudinally corresponding holes in the first and second housing portions.

As the rotatable shaft rotates about its longitudinal axis, the forward cammed surface on the diametrically opposed ears (propeller or the like) attached to the flange which itself is attached/part of the shaft, rotate as well. The cammed surface engages the sloped surface on the first end of each diametrically opposite respective pin, effecting a motion therein, in a longitudinal direction away from the cam surface. This longitudinal motion of the pin disengages that pin from the first housing, as the ear is thus permitted to slide therepast. As the rotatable shaft rotates, the sleeve within the first end of the second housing rotates as well, because of the intermating engagement between its slots and the tabs on the annular flange supporting the ears. The sloped surfaces of the cam openings in the annular sleeve engage the sloped planar surface on the cap on the second end of the longitudinally directed pins, so as to force them back into the holes at the first end of the first housing after the ears have rotated therepast. The cam openings in the rotatable sleeve are about 10 to 15 degrees out of rotative phase with respect to the cam surface on the forward edge of its corresponding ear. As soon as one of the rotating ears causes one of the pins to longitudinally move from its opening in the first housing, the sleeve cam rotates into engagement with the other end of that particular pin, to push that pin back into its respective opening in the first housing.

Thus, a plurality of circumferentially spaced apart longitudinally, reciprocally, moveable pins are caused to move back and forth, depending upon which cammed surface pushes them accordingly.

A power output such as propeller blades or the like may be arranged at each ear, radially outwardly thereof so as to provide a rotatably power output, such a rotatable output may also comprise a sprocket, a pulley, or the like. It is to be noted that such a propeller blade arrangement, sprocket, pulley or the like may be utilized to provide a rotative input into a rotatable shaft disposed within a pair of stationary housings. The reciprocating pins thereby keeping the spaced apart housings into a locked non-rotative engagement with respect to one another.

By virtue of only two (could be higher percentage) diametrically opposite pins being displaced at any one particular time, there remains at least a plurality of pins which are always connectively engaged between the holes in the first end of the first housing and the first end of the second housing. It is only when the pair of opposed ears (propeller etc.) sweep past any diametrically opposite pins, with the cam surfaces causing the corresponding longitudinal movement of the pins, are those pins moved out of engagement between the two housings. Otherwise, those housings are in connected, secure non-rotative engagement with one another.

The invention thus comprises a transmission for the distribution of power from a rotating shaft, which shaft is supported between a pair of housing segments, which housing segments are connectedly joined to one another, including a rotatable shaft having a power source at one end thereof, for rotation of the shaft; a first housing enclosing at least a portion of the rotatable shaft, the housing having a first end with a plurality of spaced apart longitudinally directed holes therein; a flange having at least one radially directed projection thereon, the projection having a cammed surface which sweeps across the holes on the first end of the first housing. It includes a second housing having a first end with a plurality of circumferentially spaced apart longitudinally directed holes therein, a plurality of reciprocally moveable pins disposed within the holes in the first and the second housing; and a cam arranged within the second housing, so as to effectuate longitudinal movement of the pins within the second housing to return their engagement with the holes in the first housing, thus locking the housing portions into non-rotative engagement with one another as the radially projecting cam (propeller or the like) sweeps past the pin.

The invention also includes a transmission for the deployment of power from a rotating shaft, comprising a first housing disposed around one end of the rotating shaft, a second housing disposed around a further portion of the rotating shaft, an arrangement of correspondingly aligned longitudinally directed holes in each adjacent end of the first and second housings, a plurality of reciprocally moveable pins arranged in the holes, a pair of cam members, arranged to move the pins into and out of connective engagement with the first and second housing; and a power takeoff member arranged in contact with one of the cam members, so as to transfer rotary power between the rotating shaft and a further drive member. The first and second cam members, rotate about a common axis. The cam members are longitudinally spaced apart from one another, and are angularly out of phase with one another. The cam members are secured to the shaft.

The pins have a sloped surface on each end thereof, to permit engagement with the cam members, as they rotate into engagement therewith. The pins have a cap on one end thereof, the cap having a side surface which is shaped to slidingly engage an inner wall portion of its respective housing, to prevent rotation of the pin about its own longitudinal axis.

The invention includes a method of transferring power to and from a rotatable shaft supported within split housing transmission while maintaining the housing portions in an engaged non-rotatable relationship, comprising the steps of: supporting a rotatable shaft within a first housing portion and a second housing portion, the housings being separated by a gap therebetween; connecting a radially extending finger cam from the shaft so as to extend outwardly through the gap; arranging a plurality of pins in a longitudinally displaceable manner between a corresponding plurality of holes in adjacent ends of the housing portions, the pins having one end contactable by the finger cam; connecting an annular cam member to the shaft near the other end of the pins; and rotating the shaft to cause the finger cam and the annular cam to sequentially displace and re-emplace only a portion of the pins with respect to the holes in one of the housing portions. The method includes separating the finger cam and the annular cam member by an angular separation, and transferring power with respect to the shaft, by a power transfer member secured to the finger.

BRIEF DESCRIPTION OF THE DRAWINGS

The objects and advantages of the present invention will become more apparent, when viewed in conjunction with the following drawings, in which:

FIG. 1 is a side elevational view, partly in section, of the transmission of the present invention; and FIG. 2 is an exploded view, partly in section, of the transmission shown in FIG. 1, with portions deleted, for ease of viewing.

DESCRIPTION OF THE PREFERRED EMBODIMENTS

Referring now to the drawings in detail, and particularly to FIG. 1, there is shown the present invention which comprises a split housing transmission 10, including an elongated, rotatable transmission shaft 12, which shaft 12 is rotatably disposed within an elongated divided housing 14. The divided housing 14 is comprised of at least a first housing portion 16, and a second housing portion 18, coaxially surrounding the shaft 12, between which housing portions 16 and 18, power may be taken from or provided to the shaft 12, while maintaining the housing portions 16 and 18 in non-rotative, longitudinal engagement with one another.

Each housing portion 16 and 18 has an annular array of longitudinally directed holes 20(a) and 20(b) spaced circumferentially therearound, the holes 20(a) and 20(b) being in longitudinal alignment with one another, between their respective housings 16 and 18, as shown by dashed line 22, for one of the hole pairs, in FIG. 2.

The rotatable shaft 12 disposed within the housing portions 16 and 18 has an annular flange 26 rigidly attached thereon. The annular flange 26 is longitudinally adjacent a first end 38 of the first housing portion 16. The annular flange 26 has a pair of diametrically opposed ears 30 and 32 which ear 32 is not shown in the figures for clarity of the drawings, and which ears extend radially outwardly therefrom. Each ear 30 and 32 has a pair of sloped cam surfaces 34 and 36 acutely angled with respect to the plane of rotation "P" of the ears 30 and 32. The ears 30 and 32 also each have a base surface 40' which is in close rotative proximity to the longitudinally directed openings 20(a) within the first end 28 of the first housing portion 16.

The second housing portion 18 extends around the rotatable shaft 12, and is slightly spaced from yet is longitudinally adjacent to the first housing 16. The second housing 18 portion also has a corresponding plurality of spaced apart longitudinally directed circumferentially disposed holes 20(b) at its end 38 adjacent the first housing portion 16.

A pin 40 is reciprocally disposed between each of these corresponding longitudinally aligned holes 20(a) and 20(b) in the respective first and second housing portions 16 and 18. Each of the pins 40 has a first end 42 and a second end 44. The first end 42 of each pin 40 may have a cam surface such as a sloped surface 46 (or hemispherical surface, not shown) thereon arranged at an acute angle with respect to the longitudinal access of the pin 40, which acute angle is slightly higher than the acute angle of the cam surfaces with respect to their plane of rotation "P" about the longitudinal axis of the shaft 12.

The second end 44 of pin 40 has a shouldered end cap 48 thereon. The end cap 48 has a sloped planar cam surface 50 thereon, which sloped surface 50 faces in the direction opposite the direction of rotation of the shaft 12. The sloped surface 46 on the first end 42 of each pin 40 lies in a plane which is disposed at an acute angle with respect to the plane of rotation "P".

A rotatable sleeve 52 mounts radially within the first end 38 of the second housing 18. The rotatable sleeve 52 has a first end 54 with a pair of diametrically spaced apart slots 56 thereon. Each of the slots 56 mates with a correspondingly located tab 58 on the respective annular edge 60 of the annular flange 26 which carries the radially directed ears 30 and 32 attached to the rotatable shaft 12. Interdigitation between the slots 56 on the sleeve 52 and the tabs 58 on the annular flange 26 causes the sleeve 52 to rotate when the shaft 12 rotates.

The sleeve 52 has a second end 62 with a radially outwardly directed shoulder 64 thereon. The shoulder 64 includes a pair of diametrically opposite cam openings 66. Each of the cam openings 66 has a cam surface 68 which is arranged to slidably engage the sloped planar cam surface 50 on the end cap 48 on the second end 44 of each of the longitudinally directed pins 40 supported in the first end 38 of the second housing portion 18. Each cap 48 is of non-circular cross-section, and has a radially outwardly directed engagement side edge 70, of slight arcuate configuration. The engagement side 70 of each cap 48 is in sliding contact with the inner surface 72 of the second housing portion 18, thereby preventing each pin 40 from rotating about its longitudinal axis.

In operation of the present invention, rotative power may be supplied to either end or both ends of the rotatable shaft 12 by an outside force. The first housing 16 and the second housing 18 are arranged in a stationary, supportive relationship about the rotatable shaft 12, interlocked to one another by virtue of the majority of the pins 40 extending between the longitudinally corresponding holes 20(a) and 20(b) in the first and second housing portions 16 and 18, at any given time during rotation of the shaft 12 therewithin.

As the rotatable shaft 12 rotates (as shown by arrow "A" in FIG. 1) about its longitudinal axis, the forward cammed surfaces 34 and 36 on the diametrically opposed ears 30 and 32 attached to the flange 26 which itself is attached/part of the shaft 12, rotate as well. The cammed surfaces 34 and 36 engage the sloped surface 46 on the first end 42 of each diametrically opposite respective pin 40, effecting a motion therein, in a longitudinal direction away from the cam surface 34 and 36 on the respective ears 30 and 32. This longitudinal motion of any particular pin 40 disengages that pin 40 from the first housing 16, as one of the ears 30 or 32 is thus permitted to slide therepast. As the rotatable shaft 12 rotates, the sleeve 52 within the first end 38 of the second housing 18 rotates as well, because of the intermating engagement between its slots 56 and the tabs 58 on the annular flange 26 supporting the ears 30 and 32. The sloped surfaces 68 of the cam openings 66 in the annular sleeve 52 engage the sloped planar surface 50 on the cap 48 on the second end 44 of the longitudinally directed pins 40, so as to force them back into the holes 20(a) at the first end 28 of the first housing 16 after the ears 30 and 32 have rotated therepast. The cam openings 66 in the rotatable sleeve 52 are about 10 to 15 degrees out of angular rotative phase with respect to the cam surface 34 or 36 on the forward edge of its corresponding ear 30 or 32. As soon as one of the rotating ears 30 or 32 causes one of the pins 40 to longitudinally move from its opening 20(a) in the first housing 16, the sleeve 50 with its cam 68 rotates into engagement with the other end 44 of that particular pin 40, to push that pin 40 back into its respective opening 20(a) in the first housing 16.

Thus, a plurality of circumferentially spaced apart longitudinally, reciprocally, moveable pins 40 are caused to move back and forth, depending upon which cammed surface pushes them accordingly.

A power output transfer member 80, (such as a propeller) blade(s) may be arranged around the flange 26 and secured thereto, at each ear 30 and 32, radially outwardly thereof so as to provide a rotatably power output, not shown for clarity, such a rotatable output may comprise a propeller, sprocket, a pulley, or the like. It is to be noted that such a propeller, sprocket, pulley or the like may be utilized to provide a rotative input into a rotatable shaft 12 disposed within a pair of stationary housings 16 and 18 having a circumferential gap 53 spaced therebetween. The reciprocating pins 40 thereby keeping the housings 16 and 18 into a locked non-rotative engagement with respect to one another.

By virtue of only two diametrically opposite pins 40 being displaced at any one particular time, there remains a plurality of other pins 40 which are always connectively engaged between the holes 20(a) in the first end 28 of the first housing 16 and the holes 20(b) in the first end 38 of the second housing 18. It is only when the pair of opposed ears 30 and 32 sweep past any diametrically opposite pins 40, with the cam surfaces 34 and 36 causing the corresponding longitudinal movement of the pins 40, are those pins moved out of engagement between the two housings 16 and 18. Otherwise, those housings 16 and 18 are in connected, secure engagement with one another.

I claim:

1. A transmission for the distribution of power from a rotating shaft, which shaft is supported between a pair of housing segments, which housing segments are connectedly joined to one another, comprising:

a rotatable shaft having a power source at one end thereof, for rotation of said shaft;

a first housing enclosing at least a portion of said rotatable shaft, said housing having a first end with a plurality of spaced apart longitudinally directed holes therein;

a flange having at least one radially directed projection thereon, said projection having a cammed surface thereon, and which radial projection sweeps across said holes on said first end of said first housing;

a second housing having a first end with a plurality of circumferentially spaced apart longitudinally directed holes therein;

a plurality of reciprocally moveable pins disposed within said holes in said first and said second housing; and a cam arranged within said second housing, so as to effectuate longitudinal movement of said pins within said second housing to return their engagement with said holes in said first housing, thus locking said housings into non-rotative engagement with one another as said radial projection sweeps past said pin.

2. A transmission for the deployment of power from a rotating shaft, comprising;

a first housing disposed around one end of said rotatable shaft;

a second housing disposed around a further portion of said rotatable shaft;

an arrangement of correspondingly aligned longitudinally directed holes in each adjacent end of said first and second housings;

a plurality of reciprocally moveable pins arranged in said holes;

a first and second arrangement of cam members, arranged to cammably move said pins into and out of connective engagement between said first and second housings; and a power takeoff member arranged in contact with said first cam member arrangement, so as to transfer rotary power between said rotatable shaft and said cam members.

3. The transmission apparatus as recited in claim 2, where said first and second cam member arrangements are attached to said rotatable shaft.

4. The transmission apparatus as recited in claim 3, wherein said first and second cam members are longitudinally spaced apart from one another, and are angularly out of phase with one another.

5. The transmission apparatus as recited in claim 2, wherein said first and second cam members are secured to said shaft.

6. The transmission apparatus as recited in claim 2, wherein said pins have a sloped surface on each end thereof, to permit engagement with said cam member arrangements, as they rotate into engagement therewith.

7. The transmission apparatus as recited in claim 2, wherein said pins have a cap on one end thereof, said cap having a side surface which is shaped to slidingly engage an inner wall portion of its respective housing, to prevent rotation of said pin about its own longitudinal axis.

8. The transmission apparatus as recited in claim 2, wherein said power takeoff member comprises an arrangement of propeller blades.

9. A method of transferring power to and from a rotatable shaft supported within split housing transmission while maintaining portions of said split housing in an engaged non-rotatable relationship, comprising the steps of:

supporting a rotatable shaft within a first housing portion and a second housing portion, said housings being separated by a circumferential gap spaced therebetween;

connecting a radially outwardly projecting cam from said shaft so as to extend outwardly through said gap;

arranging a plurality of pins in a longitudinally displaceable manner between a corresponding plurality of holes in adjacent ends of said housing portions, said pins having one end contactable by said projecting cam;

connecting an annular cam member to said shaft near the other end of said pins; and rotating said shaft to cause said finger cam and said annular cam to sequentially displace and re-emplace only a portion of said pins with respect to said holes in one of said housing portions.

10. The method of claim 9, including the step of:

separating said projecting cam and said annular cam member by an angular separation.

11. The method of claim 10, including the step of:

transferring power with respect to said shaft, by a power transfer member secured to said projecting cam.

12. The method as recited in claim 9, including the step of:

attaching a propeller arrangement radially outwardly of said projecting cam to transfer power from said rotable shaft between said housings outwardly therefrom.

* * * * *